United States Patent [19]

Dei

[11] Patent Number: 5,727,179
[45] Date of Patent: Mar. 10, 1998

[54] MEMORY ACCESS METHOD USING INTERMEDIATE ADDRESSES

[75] Inventor: Katsuhito Dei, Yokohama, Japan

[73] Assignee: Canon Kabushiki Kaisha, Tokyo, Japan

[21] Appl. No.: 466,760

[22] Filed: Jun. 6, 1995

Related U.S. Application Data

[63] Continuation of Ser. No. 799,164, Nov. 27, 1991, abandoned.

[30] Foreign Application Priority Data

Nov. 30, 1993 [JP] Japan ................. 2-330893

[51] Int. Cl.$^6$ .................. G06F 13/18; G06F 12/10
[52] U.S. Cl. .................. 395/416; 395/417; 395/478
[58] Field of Search .................. 395/412, 416, 395/417, 477, 478

[56] References Cited

U.S. PATENT DOCUMENTS

| | | | |
|---|---|---|---|
| 4,498,146 | 2/1985 | Martinez | 395/442 |
| 4,692,858 | 9/1987 | Redford et al. | 395/333 |
| 4,928,224 | 5/1990 | Zulian | 395/309 |
| 5,117,350 | 5/1992 | Parrish et al. | 395/401 |
| 5,170,465 | 12/1992 | McKeeman et al. | 395/707 |
| 5,179,703 | 1/1993 | Evans | 395/703 |

*Primary Examiner*—Eddie P. Chan
*Assistant Examiner*—Reginald Bragdon
*Attorney, Agent, or Firm*—Fitzpatrick, Cella, Harper & Scinto

[57] ABSTRACT

In an access method, with which a first processor in a first processor unit can access a memory in a second processor unit in a multi-processor system, a virtual address generated by the first processor is translated into an intermediate address common to the system. The generated intermediate address is output onto a system bus, and is fetched by the second processor unit. The fetched intermediate address is translated into a real address in the second processor. The memory is accessed using the translated real address.

11 Claims, 4 Drawing Sheets

1

MEMORY ACCESS METHOD USING INTERMEDIATE ADDRESSES

This application is a continuation of application Ser. No. 07/799,164, filed Nov. 27, 1991, now abandoned.

BACKGROUND OF THE INVENTION

1. Field of the Invention

The present invention relates to a memory access method in a multi-processor system including a plurality of processors each having a specific memory.

2. Related Background Art

In a conventional multi-processor system (to be referred to as a system hereinafter), an arrangement having a shared memory accessed by all the processors, or an arrangement having specific memories corresponding to respective processors in addition to the shared memory to improve processing efficiency is normally employed. The shared memory adopts an arrangement wherein all the memories are concentrically arranged in a single storage device, an arrangement wherein shared memories are separately arranged in a plurality of storage devices in correspondence with processors, or an intermediate arrangement therebetween.

However, in a system wherein the shared memories are concentrically arranged, a contention among memory accesses from a plurality of processors occurs, and processing efficiency is impaired due to bottleneck in bus use of memory access. In order to solve this problem, a system wherein specific memories belonging to processors are added is normally used. Since each specific memory cannot be accessed from other processors, shared data which may be used by other processors cannot be stored in the specific memory, thus posing a problem. If a processor stores shared data in its specific processor, it must frequently perform inter-processor communication to maintain coherency of given data since the given data may be present in specific memories belonging to other processors. For this reason, an excessive load is exerted on the system, thus posing another problem.

Furthermore, in an arrangement wherein the shared memories are separately arranged, a processor and a memory are often paired as one unit i.e., paired units, (to be referred to as "PU" hereinafter). Identification numbers (to be referred to as PU-IDs hereinafter) are set in units of PUs, and shared memory addresses of the system are determined on the basis of the PU-IDs and memory addresses in the PUs so as to prevent memory addresses from contending among the PUs. More specifically, when the system is started, the memories are arranged according to the system arrangement, so that the addresses of the shared memories can be commonly used in the entire system. However, in this system arrangement, for example, in a system including eight PUs, if one PU malfunctions, an insufficient space is formed on the physical memory space. In this case, the system must be re-arranged or re-started.

SUMMARY OF THE INVENTION

It is an object of the present invention to provide a memory access method, with which processors can access specific memories of other processors in a multi-processor system.

It is another object of the present invention to provide a memory access method, which can attain high use efficiency of memories in a multi-processor system.

It is still another object of the present invention to provide a memory access method, which can reduce a processing load for maintaining coherency of data in a multi-processor system.

According to one aspect, the present invention which achieves these objectives relates to an access method, with which a first processor in a first processor unit can access a memory in a second processor unit in a multi-processor system, comprising the steps of: translating a virtual address generated by the first processor into an intermediate address common to the system; outputting the generated intermediate address onto a system bus; fetching the output intermediate address in the second processor unit; translating the fetched intermediate address into a real address in the second processor; and accessing the memory using the translated real address.

According to another aspect, the present invention which achieves these objectives relates to a memory access method in a multi-processor system, comprising the steps of: checking if an entry corresponding to a virtual address generated by a processor of a first processor unit is present in an internal memory of the first processor unit; translating the virtual address into an intermediate address common to the system and outputting the intermediate address onto a system bus when it is determined that the entry corresponding to the virtual address is not present in the internal memory; fetching the output intermediate address in a second processor unit if the second processor unit has an entry corresponding to the intermediate address in an internal memory; translating the fetched intermediate address into a real address in the second processor unit; and accessing the internal memory of the second processor unit by the translated real address.

According to still another aspect, the present invention which achieves these objectives relates to a processor unit comprising: a processor for outputting a virtual address for accessing a memory; first translation means for translating the virtual address output from the processor into a real address in the unit; an internal memory, which can be accessed by the real address; second translation means for translating the virtual address output from the processor into a common intermediate address on a system bus, and outputting the intermediate address onto the system bus; third translation means for translating the intermediate address input through the system bus into the real address in the unit; and an arbiter for arbitrating an access to the internal memory by the real address translated by the first translation means, and an access to the internal memory by the real address translated by the third translation means.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

An embodiment of the present invention will be described below with reference to the accompanying drawings.

Figure 1:
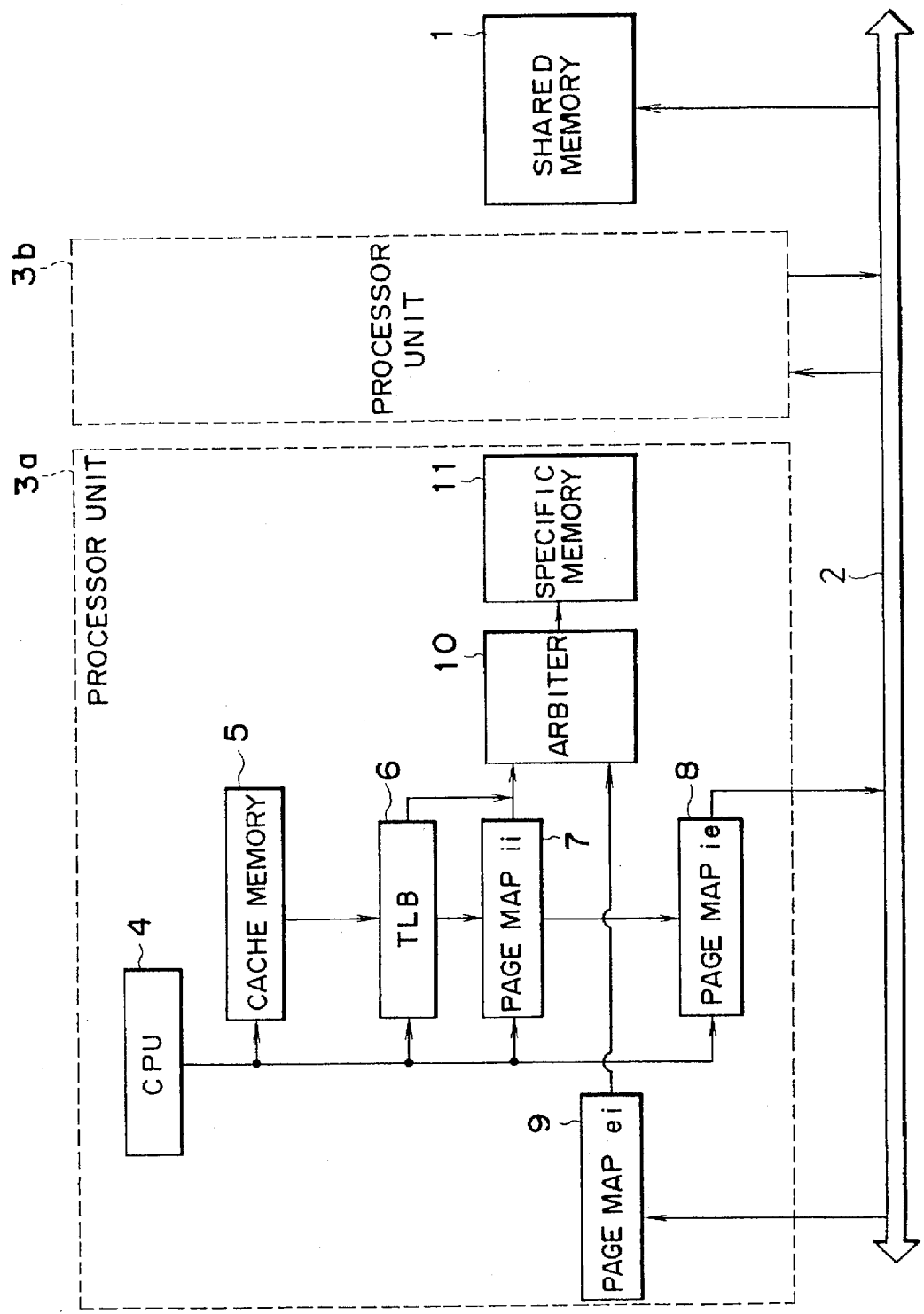
FIG. 1 is a block diagram showing an arrangement of a multi-processor system according to an embodiment of the present invention.

FIG. 1 is a block diagram showing an arrangement of a multi-processor system as a typical embodiment of the present invention. In FIG. 1, the system includes a shared memory 1 accessed from processors, a common bus 2 connected to processor units (to be referred to as PUs hereinafter), the shared memory 1, an I/O system (not shown), and the like, and PUs 3a, 3b, . . . . Each PU comprises a CPU 4, a cache memory (to be referred to as a cache hereinafter) 5, a translation look-aside buffer (to be referred to as a TLB hereinafter) 6, a page map ii 7 for translating a virtual address to an internal memory address (to be referred to as an internal address hereinafter), a page map ie 8 for translating a virtual address into an intermediate address common to the system, a page map ei 9 for translating an intermediate address common to the system to an internal address, an arbiter 10 for arbitrating memory accesses based on requests from the PU and those from external units, and a specific memory 11, which can be accessed by other PUs.

The cache 5 includes units such as a cache tag, a comparator, and the like, which are necessary for constituting a cache system. In this embodiment, the cache 5 is externally connected to the CPU 4. Alternatively, a cache built-in type CPU may be used.

A virtual address issued by the CPU 4 is supplied to the cache 5, the TLB 6, the page map ii 7, and the page map ie 8. The cache 5 then checks if the virtual address issued by the CPU 4 hits data in the cache 5. When the address hits data in the cache 5, address translations in the TLB 6, the page map ii 7, and the page map ie 8 are stopped, and hit data is transferred to the CPU 4. In addition, in a write hit mode, information according to the cache coherence protocol is transmitted onto the common bus 2.

Contrary to this, when no cache hit occurs in the cache 5, the TLB 6, which holds the internal addresses of the specific memory 11, checks if the virtual address issued by the CPU 4 is present in the specific memory 11. If an entry corresponding to the virtual address is present in the TLB 6, the virtual address is translated into an internal address by the TLB 6, and the internal address is supplied to the specific memory 11 through the arbiter 10.

At a hit in TLB6 time, a message indicating this is informed to the page map ii 7 so as to inhibit an address translation to the internal address. Furthermore, the same message is also transmitted to the page map ie 8, thereby inhibiting an address translation by the page map ie 8.

If an entry of the virtual address is not present in the entry of the TLB 6, the address translation is performed using the page map ii 7. This translation may be executed by a memory management unit (MMU) in a hardware manner or may be executed through the CPU 4 in a software manner.

Figure 2:
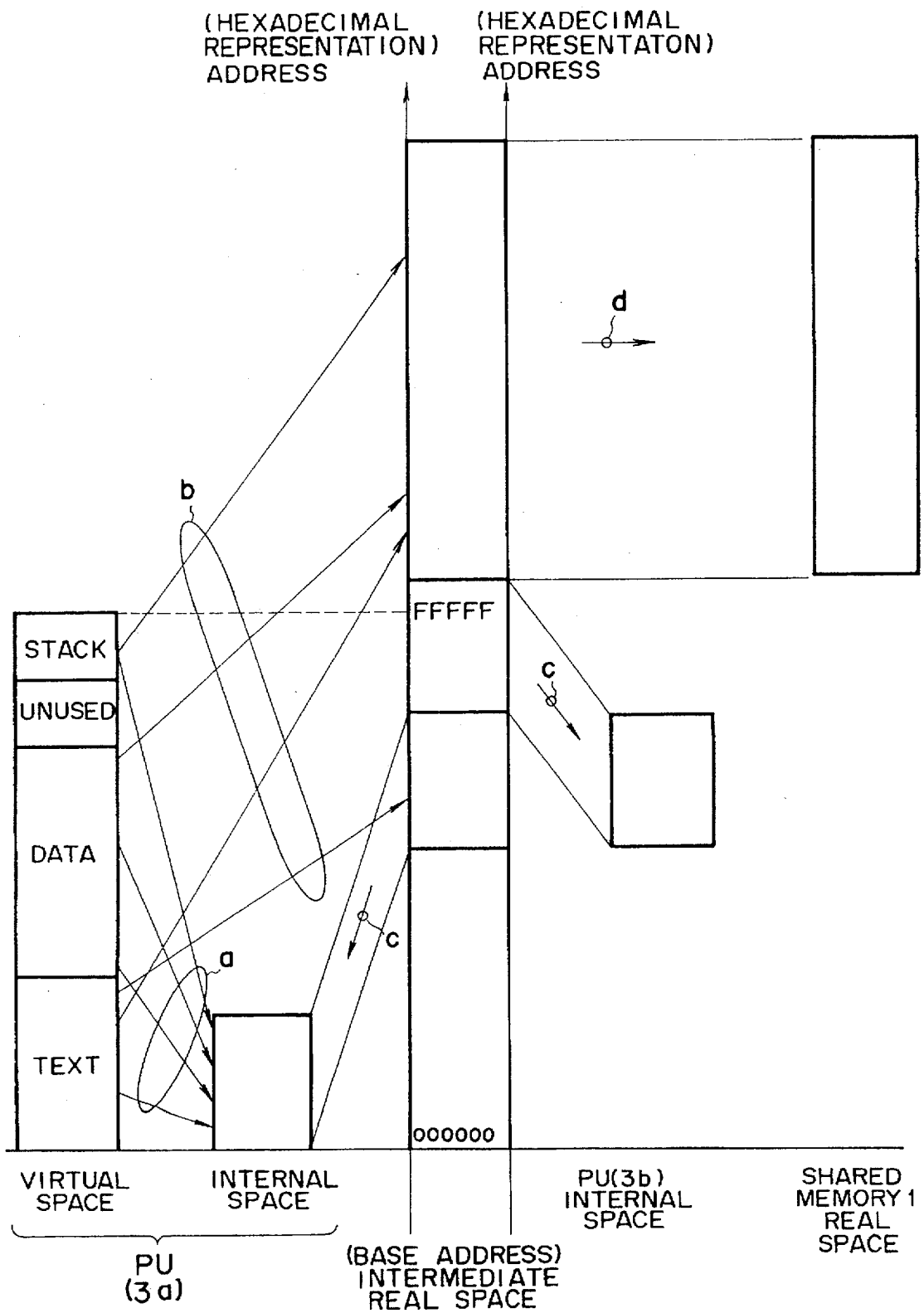
FIG. 2 is a view showing a mapping state of an address space in the embodiment shown in FIG. 1.

FIG. 2 shows the address mapping state of this embodiment. In FIG. 2, a virtual space is mapped based on a 24-bit addressing architecture.

FIG. 2 illustrates, in turn from the left side, address mapping of a virtual space of a process, which is being executed by the PU (3a), an internal space (the address space of the specific memory 11) of the PU (3a), an intermediate real space, an internal space (the address space of a specific memory of the PU (3b)) of the PU (3b), and a real space of the shared memory 1. Referring to FIG. 2, some virtual space addresses of the process, which is being executed by the PU (3a), are mapped on the internal space corresponding to the specific memory 11 of the PU (3a), as indicated by an arrow group a. The arrow group a indicates that address translations are performed between the virtual space and the internal space through the TLB 6 and the page map ii 7.

The page map ie 8 maps the virtual space of the process, which is being currently executed by the CPU 4, on the intermediate real space common to the entire system. On the intermediate real space, specific memories in the PUs, the shared memory 1, and the I/O space of an I/O system (not shown) are mapped. As indicated by an arrow group b in FIG. 2, the virtual space addresses of the process, which is being executed by the PU (3a), and other spaces are mapped as continuous addresses on the intermediate real space by the page map ie 8.

Therefore, if it is determined that the virtual address issued by the CPU 4 cannot be translated by the page map ii 7, and is not present in the specific memory 11, the virtual address is translated into an address on the intermediate real space through the page map ie 8. In this case, the intermediate real address is initially output onto the common bus 2 outside the PU 3.

The intermediate real address output onto the common bus 2 is fetched by the shared memory 1 or other PUs. An arrow group c and an arrow d in FIG. 2 indicate this. The arrow group c indicates that the intermediate real space is mapped on the specific memories of the PUs (the PUs 3a and 3b in this embodiment) upon operation of the corresponding page maps ei 9. The arrow d indicates that the real space addresses of the shared memory 1 are assigned to have the same addresses as the intermediate real space addresses.

A case will be described below wherein a portion of an area corresponding to addresses output onto the common bus 2 is present on the shared memory 1.

Virtual addresses generated by the CPU 4 are translated into intermediate real space addresses by the page map ie 8 so as to indicate a predetermined area of a given space on the intermediate real space where the shared memory 1 is mapped. The intermediate real space addresses are supplied to the shared memory 1 through the common bus 2.

A case will be examined below wherein an area of a portion corresponding to the virtual space addresses is present in a specific memory of another PU (the PU (3b) in this embodiment).

A specific memory 11 of the PU (3b) is similarly mapped on the intermediate real space as that of the PU (3a) by a page map ei included in the PU (3b). Addresses mapped on the intermediate real space by the page map ei of the PU (3b) are prepared in the page map ie 8 of the PU (3a). In this state, virtual addresses generated by the CPU 4 are translated into intermediate real space addresses by the page map ie 8 of the PU (3a) so as to indicate a predetermined area of a space, mapped by the PU (3b), on the intermediate real space. The intermediate real space addresses are supplied to the PU (3b) through the common bus 2, while the page map ei of the PU (3b) translates the input intermediate real space addresses into internal addresses of the PU (3b), and supplies them to the specific memory. In this manner, the specific memory of the PU (3b) can be accessed by virtual addresses issued by the PU (3a) through the page map ie 8 of the PU (3a) and the page map ei of the PU (3b).

As described above, the specific memory 11 is accessed by three paths, i.e., the TLB 6, the page map ii 7, and the page map ei 9. However, since accesses from the TLB 6 and the page map ii 7 exclusively occur, the specific memory 11 has two paths, i.e., an internal access path of the PU through the TLB 6 or the page map ii 7, and an external access path by the page map ei 9.

In this embodiment, the arbiter 10 is used, so that an internal access of the PU has priority over an external access. More specifically, access priority control of the specific memory is made as follows. That is, even when an external access is being executed, the internal access interrupts the external access and is preferentially executed immediately after completion of a given cycle of the external access. Upon completion of the internal access operation, the external access is restarted.

Therefore, according to this embodiment, the PU (3a) prepares, in its page map ie 8, addresses indicating a predetermined area of a space where the shared memory 1 is mapped, and addresses indicating the intermediate real space where the specific memory (not shown) of the PU (3b) is mapped. Thus, the PU (3a) can access the shared memory 1 and the specific memory of the PU (3b) by virtual addresses generated by its CPU 4. Furthermore, since an access from its own processor to the specific memory has priority over accesses from other processors, a decrease in processing efficiency in its own processor can be prevented.

In the embodiment described above, the shared memory is mapped at the same addresses as those of the intermediate real space, and in an address translation from the intermediate real space to the internal space of each PU, only the base address of each area is shifted, so that the area itself is mapped as a continuous address space. In this embodiment, however, a case will be described below wherein another page map is arranged between the shared memory and the common bus, so that the intermediate real space is processed in predetermined small processing units (to be referred to as pages hereinafter), and an arbitrary intermediate real space is mapped on the real space of the shared memory or the internal space of each PU in units of pages.

Note that this embodiment uses an apparatus having substantially the same arrangement as that of the memory access apparatus used in the above embodiment, except that another page map is arranged between the shared memory and the common bus. Therefore, the same reference numerals in this embodiment denote common units to those in FIG. 1, and a detailed description of apparatus units common to those in the above embodiment will be omitted.

Figure 3:
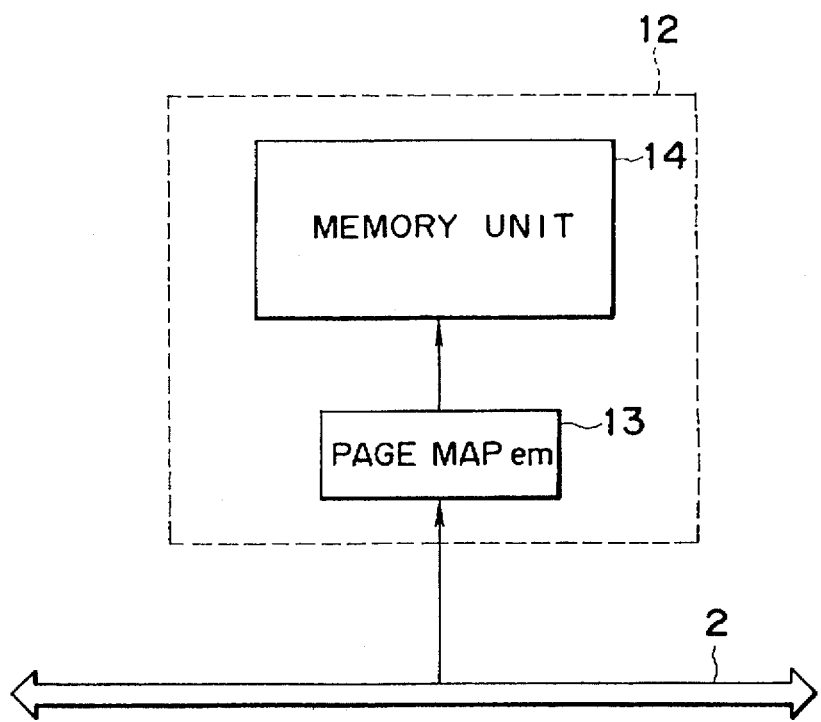
FIG. 3 is a diagram showing an arrangement of a shared memory according to another embodiment of the present invention.

FIG. 3 shows an arrangement of a shared memory 12 used in this embodiment. A page map em 13 is arranged between a memory unit 14 and a common bus 2. Intermediate real addresses on the common bus 2 are translated into internal addresses of the memory unit 14 by the page map em 13 so as to access the memory unit 14.

Figure 4:
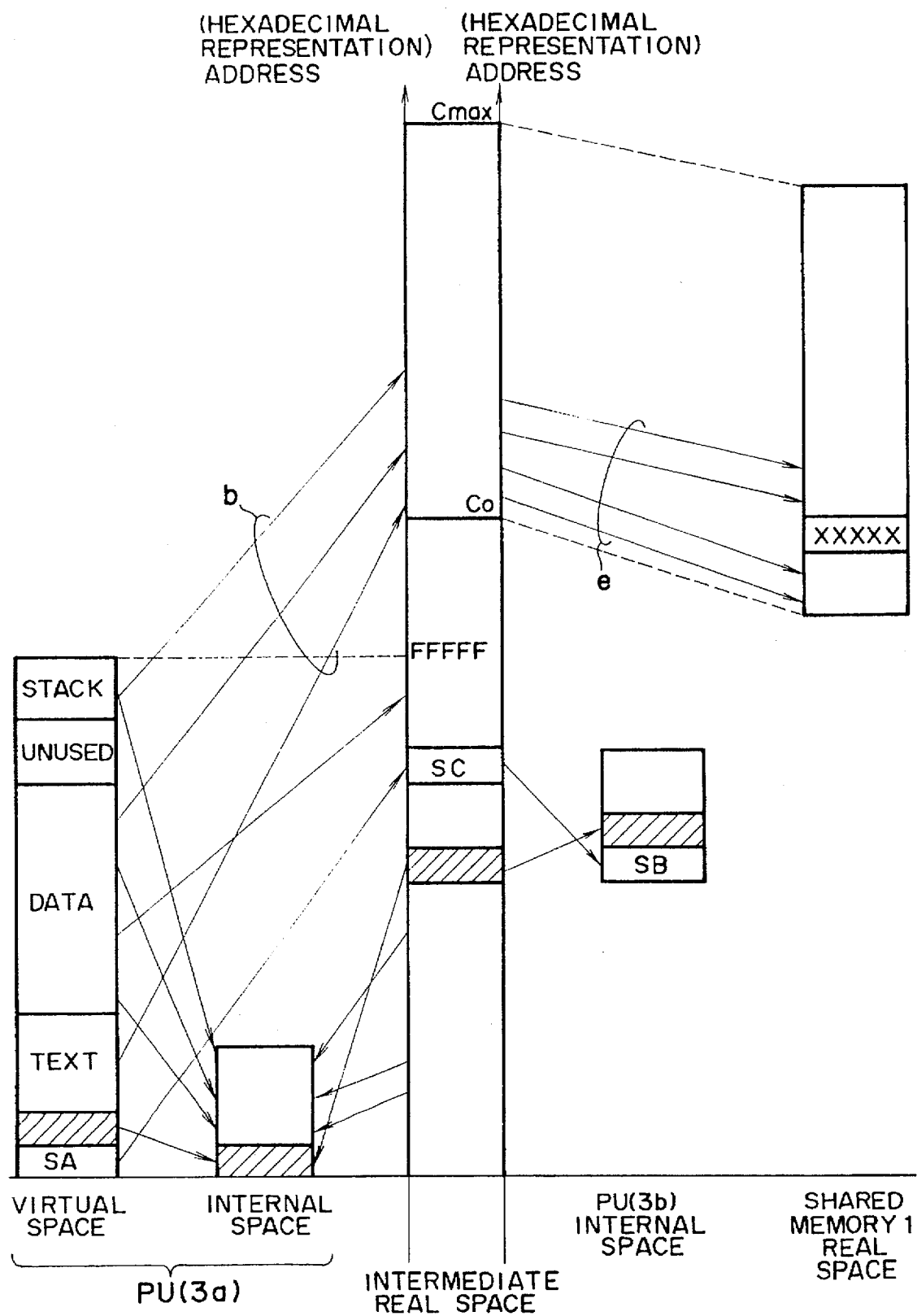
FIG. 4 is a view showing a mapping state of an address space in the embodiment shown in FIG. 3.

FIG. 4 shows a mapping state of address spaces in this embodiment. Cases will be explained below with reference to FIG. 4 wherein a process, which is being executed by a PU (3a) accesses the shared memory 12, and wherein it accesses a specific memory of a PU (3b).

In the case of an access to the shared memory 12, the pages of the virtual space of the process, which is being executed by the PU (3a) are address-translated to an area between intermediate real space addresses $C_O$ to $C_{max}$ by a page map ie 8. The intermediate real space addresses are translated into internal addresses of the memory unit 14 by the page map em 13 in the shared memory 12. At this time, since the internal address translation to the memory unit 14 is executed in units of pages, it can be normally executed as long as continuous addresses in units of page sizes are present in the memory unit 14. Therefore, even when a portion of the shared memory 12 suffers from a defective address area, and cannot be accessed (a portion indicated by [xxxx] on the real space of the shared memory shown in FIG. 4), the intermediate real space can be mapped without using this portion.

A case will be described below wherein the process accesses the specific memory of the PU (3b).

Addresses of a page (SA) of a portion of a text of the process, which is being executed by the PU (3a) shown in FIG. 4, are address-translated into addresses of an area (SC) on the intermediate real space by the page map ie 8. These addresses are mapped on an area (SB), where the specific memory of the PU (3b) is allocated, by a page map ei of the PU (3b). In this embodiment, a page of a portion of the process, which is being executed by the PU (3a), in particular, a common area for executing the process, is mapped in the internal spaces of the PUs (3a and 3b), as indicated by hatched areas in FIG. 4, thereby utilizing the internal memories allowing high-speed responses.

Therefore, according to this embodiment, even when a portion of the shared memory 12 suffers from a trouble, and cannot be used, the intermediate real space can be mapped without using the trouble portion. In this manner, a system down caused by the trouble portion of the shared memory can be prevented. In addition, since the specific memories of other PUs can be accessed in units of pages, memory resources can be efficiently utilized.

In the above two embodiments, an internal access to the specific memory in the PU has priority over an external access. However, the present invention is not limited to this. For example, the access priority order of the specific memory can be dynamically controlled in consideration of the load balance of PUs.

More specifically, when a process A, whose processing cannot be shared, is executed by only one PU of the multi-processor system, only the load of the PU, which executes the process, is increased, and other PUs suffer from only small loads for maintaining the system, e.g., loads of clock output, network management, and the like. For this reason, since the frequency of accesses from internal CPUs to specific memories belonging to other PUs is decreased, the specific memories are often assigned to execute the process A. Under this condition, in order to increase the processing efficiency of the process A, the access priority order of the specific memories of other PUs, except for a PU, which must execute a process requiring a high-speed response such as interrupt processing, is dynamically controlled to assign higher priority to external accesses. With this control, a process, which requires a large memory capacity, can be efficiently operated, and the memory resources can be effectively utilized.

As described above, according to the present invention, in the multi-processor system, since specific memories of processors can be accessed by other processors, the use efficiency of memories can be improved.

What is claimed is:

1. A memory access method in a multi-processor system, comprising the steps of:

checking if an entry corresponding to a virtual address generated by a processor of a first processor unit is present in an internal memory of the first processor unit;

translating the virtual address into an intermediate address which is a unique address in an address space of the multi-processor system and outputting the intermediate address, said checking and translating steps being performed simultaneously;

stopping said translating step, translating the virtual address into an internal address and accessing the internal memory of the first processor unit by the internal address when it is determined that the entry corresponding to the virtual address is present in the internal memory of the first processor unit;

completing said translating step and outputting the intermediate address onto a system bus when it is determined that the entry corresponding to the virtual address is not present in the internal memory of the first processor unit;

fetching the output intermediate address in a second processor unit if the second processor unit has an entry corresponding to the intermediate address in an internal memory of the second processor unit;

translating the fetched intermediate address into a real address in the second processor unit; and accessing the memory in the second processor unit by the translated real address.

2. A method according to claim 1, wherein an access from a processor in the second processor unit to the internal memory of the second processor unit has priority over an access thereto from the first processor unit.

3. A method according to claim 1, wherein a priority order of an access from a processor in the second processor unit to the internal memory of the second processor unit, and an access from the first processor unit thereto can be dynamically switched.

4. A method according to claim 1, wherein the multi-processor system includes a shared memory accessible by each processor with an intermediate address, and wherein the intermediate address to the shared memory coincides with a real address of the shared memory.

5. A method according to claim 1, wherein the multi-processor system includes a shared memory accessible by each processor with an intermediate address, and wherein all real addresses of the shared memory except a defective address area are mapped to intermediate addresses.

6. A processor unit in a multi-processor system comprising:

a processor for outputting a virtual address for accessing a memory;

first translation means for translating the virtual address output from said processor into a real address in said processor unit;

an internal memory, which can be accessed by the real address;

second translation means for translating the virtual address output from said processor into an intermediate address which is a unique address in an address space of said system, and outputting the intermediate address to a system bus;

third translation means for translating the intermediate address input through the system bus from said second translation means of another processor unit into the real address in said processor unit; and an arbiter for arbitrating an access to said internal memory by the real address translated by said first translation means, and an access to said internal memory by the real address translated by said third translation means.

wherein said first and second translation means simultaneously translate a same virtual address, and wherein said first translation means instructs said second translation means to stop the translation if an entry corresponding to the virtual address is found in the internal memory of the first processor unit during the translation by said first translation means.

7. A processor unit according to claim 6, wherein said arbiter awards a priority to an access to said internal memory by the real address translated by said first translation means over an access thereto by the real address translated by said third translation means.

8. A processor unit according to claim 6, wherein said arbiter dynamically changes a priority order of an access to said internal memory by the real address translated by said first translation means and an access thereto by the real address translated by said third translation means.

9. A multi-processor system including a plurality of processor units, each of said processor units comprising:

a processor for outputting a virtual address for accessing a memory;

first translation means for translating the virtual address output from said processor into a real address in said processor unit;

an internal memory, which is accessed by the real address;

second translation means for translating the virtual address output from said processor into an intermediate address which is a unique address in an address space of said system on a system bus, and outputting the intermediate address onto the system bus;

third translation means for translating the intermediate address input through the system bus from said second translation means of another processor unit into the real address in said processor unit; and an arbiter for arbitrating an access to said internal memory by the real address translated by said first translation means, and an access to said internal memory by the real address translated by said third translation means, wherein said first and second translation means simultaneously translate a same virtual address, and wherein said first translation means instructs said second translation means to stop the translation if an entry corresponding the the virtual address is found in the internal memory of the first processor unit during the translation by said first translation means.

10. A multi-processor system according to claim 9, wherein said system includes a shared memory accessible by each processor unit with an intermediate address, with the intermediate address to the shared memory coinciding with a real address of the shared memory.

11. A multi-processor system according to claim 9, wherein said system includes a shared memory accessible by each processor unit with an intermediate address, and wherein all real addresses of the shared memory except a defective address area are mapped to intermediate addresses.

* * * * *